(12) United States Patent
Mangano et al.

(10) Patent No.: US 7,792,030 B2
(45) Date of Patent: Sep. 7, 2010

(54) METHOD AND SYSTEM FOR FULL-DUPLEX MESOCHRONOUS COMMUNICATIONS AND CORRESPONDING COMPUTER PROGRAM PRODUCT

(75) Inventors: Daniele Mangano, Messina (IT); Alberto Scandurra, Messina (IT); Giuseppe Guarnaccia, Catania (IT)

(73) Assignee: STMicroelectronics S.R.L., Agrate Brianza (Milano) (IT)

( * ) Notice: Subject to any disclaimer, the term of this patent is extended or adjusted under 35 U.S.C. 154(b) by 122 days.

(21) Appl. No.: 12/112,183

(22) Filed: Apr. 30, 2008

(65) Prior Publication Data
US 2008/0294803 A1 Nov. 27, 2008

(30) Foreign Application Priority Data
May 24, 2007 (EP) .................................. 07108878

(51) Int. Cl.
H04J 1/16 (2006.01)
H04L 1/00 (2006.01)
H04L 12/26 (2006.01)

(52) U.S. Cl. ..................... 370/230.1; 370/231; 370/236
(58) Field of Classification Search .......... 370/229–240
See application file for complete search history.

(56) References Cited

U.S. PATENT DOCUMENTS

| | | | | |
|---|---|---|---|---|
| 4,544,964 A * | 10/1985 | Burns et al. | .................... | 360/51 |
| 6,141,765 A | 10/2000 | Sherman | | |
| 6,687,228 B1 * | 2/2004 | Fichou et al. | ............... | 370/232 |
| 2002/0146036 A1 * | 10/2002 | Berger | ........................ | 370/468 |
| 2004/0174890 A1 * | 9/2004 | Chen et al. | ................... | 370/402 |
| 2005/0198416 A1 * | 9/2005 | Kim | ............................ | 710/100 |
| 2007/0067514 A1 * | 3/2007 | Anderson et al. | ............. | 710/70 |
| 2007/0081414 A1 | 4/2007 | Douady et al. | | |
| 2008/0267211 A1 * | 10/2008 | Gangwal et al. | ............ | 370/458 |

OTHER PUBLICATIONS

European Search Report EP 07 10 8878; Nov. 5, 2007.
Chattopadhyay, et al. "GALDS: A Complete Framework for Designing Multiclock ASICs and SoCs"; IEEE Transactions on Very Large Scale Integration (VLSI) Systems; Jun. 2005; pp. 641-654; vol. 13, No. 6; IEEE Service Center, Piscataway, NJ, US.
Yun, et al. "Pausible Clocking-Based Heterogeneous Systems": IEEE Transactions on Very Large Scale Integration (VLSI) Systems; Dec. 1999; pp. 482-488; Vo. 7, No. 4; IEEE Service Center.
Wiklund, et al. "SoCBUS: Switched Network on Chip for Hard Real Time Embedded Systems"; Parallel and Distributed processing Symposium; Apr. 22, 2003; pp. 78-85; IEEE, Piscataway, NJ US.

* cited by examiner

*Primary Examiner*—Ronald Abelson
(74) *Attorney, Agent, or Firm*—Hogan Lovells US LLP

(57) ABSTRACT

Data transport is provided in a communication network such as a Network-on-Chip arrangement via full-duplex mesochronous links between routers. Request signals and response signals are exchanged between these routers acting alternatively as an initiator and a target operating in respective clock domains at opposite ends of respective full-duplex mesochronous links. The request initiator flow control signals are monitored at the target end of the link while the response target flow control signals are monitored at the initiator end of the link. The monitoring action involves ascertaining if a request has been granted at the initiator end of the link and if a response has been granted at the target end of said link thus correspondingly managing the data flow over the link.

16 Claims, 4 Drawing Sheets

METHOD AND SYSTEM FOR FULL-DUPLEX MESOCHRONOUS COMMUNICATIONS AND CORRESPONDING COMPUTER PROGRAM PRODUCT

RELATED APPLICATION

This application claims priority of European Patent Application No. 07108878.5 filed May 24, 2007 and entitled Method and System for Full-duplex Mesochronous Communications and Corresponding Computer Program Product, which is incorporated herein in its entirety by this reference.

FIELD OF THE INVENTION

The present invention relates to communication techniques, and was devised with special attention paid to use in the System-on-Chip (SoC) interconnect domain.

BACKGROUND

European Patent Application 06291440 discloses a synchronization system for synchronizing modules in an integrated circuit including a so-called SKew Insensitive Link (SKIL) to implement a mesochronous mechanism (see also D. Mangano, et al.: "Skew Insensitive Physical Links for Network on Chip", 1st International Conference on Nano-Networks (NANO-NET 2006), Lausanne, Switzerland, 14-16 Sep. 2006.

As is well known, the term "mesochronous" denotes a relationship between two signals such that their corresponding significant instants occur at the same average rate. A mesochronous network is thus a network where the clocks run with the same frequency but unknown relative phases.

The arrangement disclosed in European Patent Application 06291440 overcomes a number of disadvantages inherent in certain conventional techniques for mesochronous on-chip communication, which are based on implementations that are not standard (i.e. where standard-cell technologies cannot be used).

Exemplary of such conventional techniques are e.g.:
- F. Mu, C. Svensson: "Self-Tested Self-Synchronization circuit for mesochronous clocking", IEEE Transactions on Circuits and Systems-II: Analog and Digital Signal Processing, February 2001, Vol. 48 No. 2, pp. 129-141;
- B. Mesgarzadeh, C. Svensson, A. Alvandpour: "A new mesochronous clocking scheme for synchronization in SoC", Proc. Of the ISCAS, 2002, pp. 605-609; or
- E. C. Svensson: "Timing closure through globally synchronous, timing portioned design methodology", 41st Conference on Design Automation Conference, (DAC'04), pp. 71-74.

A number of patent documents disclose solutions that are not based on standard-cell technology or are not suitable for building full-duplex mesochronous links. For instance, US-A-2002/0073389 or US-A-2003/0053489 are exemplary of arrangements for supporting mesochronous on-chip communication.

Networks on Chip (NoCs) are usually designed according to a Globally Asynchronous Locally Synchronous (GALS) approach. Various approaches can be used to implement the GALS paradigm inside a NoC system.

A first solution is to build a clockless network that provides the transport service needed to interconnect the IP components running asynchronously, that is, with different clock signals locally generated. For instance, T. Bjerregaard and J. Sparsø. "Implementation of guaranteed services in the MANGO clockless network-on-chip", IEE Proc.-Comput. Digit. Tech., Vol. 153, No. 4, July 2006 discloses an example of a clockless Network on Chip. Such an approach is quite attractive, but, again, is inevitably affected by some difficulties concerning the design flow: non-standard cells are used, design of self-timed circuits is not trivial and timing verification is not reliable. Another possible approach is to use synchronizers at clock domain boundaries between the NoC running at its own clock speed and the IPs components, as disclosed e.g. by A. Radulescu, et al.: "An efficient on-chip network interface offering guaranteed services shared-memory abstraction, and flexible network configuration" Proc. 2004 Design, Automation and Test in Europe Conf. (DATE 2004), (IEEE, 2004), pp. 4-17. This solution, breaking the clock tree, introduces some benefits, but does not mitigate the physical issues due to the wire-delay effects inside the network.

SUMMARY OF THE INVENTION

As indicated, the arrangements considered in the foregoing suffer from the inability to admit a standard implementation and/or the absence of optimization to build full-duplex link supporting flow-control management. In fact, the arrangements disclosed in European Patent Application 06291440 and other prior solutions do not aim at providing full-duplex mesochronous communication links able to effectively manage flow control.

This point may become particularly significant since future on-chip communication systems will rely on the Network on Chip (NoC) paradigm. The main building blocks of a Network on Chip (NoC) are the Network Interface (NI), the router and the link. The NI(s) provide the access point for the IPs, routers provide the actual data transport mechanism, and links are used to set up point-to-point interconnections. AS indicated, NoCs are usually designed according to a Globally Asynchronous Locally Synchronous (GALS) approach: this means that multiple clock domains coexist, while routers are expected to work at the same clock frequency.

The need is therefore felt for arrangements that may allow setting up full-duplex mesochronous links with the capability to effectively manage the flow-control and able to guarantee maximum throughput, low latency (e.g. 3 clock cycles) and reduced area. A particularly felt need is for arrangements that may enable communication between synchronous units, operating with clock signals having the same frequency and arbitrary skew, that rely on a req-ack signaling protocol.

The object of the present invention is to provide an effective response to those needs.

According to the present invention, that object is achieved by means of a method having the features set forth in the claims that follow. The invention also relates to a corresponding system architecture as well as a corresponding computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

An embodiment of the arrangement described herein can be applied any time the need arises of interconnecting two different on-chip modules belonging to the same clock domain but with an arbitrary clock skew therebetween.

As is known, with CMOS technology scaling, an increasing complexity and the wire-delay problem an on-chip communication system might end up by limiting the overall SoC's performance. An embodiment of the arrangement described herein combines the Network on Chip (NoC) paradigm and the Globally Asynchronous Locally Synchronous (GALS) approach to overcome architectural and physical limitations, while the wire-delay effects inside the network are be reduced in order to avoid performance limitation.

An embodiment of the arrangement described herein effectively applies the mesochronous communication technique to the on-chip domain while permitting to build full-duplex mesochronous links able to effectively manage a req-ack flow control based on a req-ack signaling protocol.

An embodiment of the arrangement described herein enables to implement a mesochronous on-chip communication scheme in an effective manner, even if full-duplex channels are needed and a req ack flow control is required, which is the most likely operating scenario for future SoCs.

A preferred embodiment of the arrangement described herein is adapted to provide point-to-point links in current and future SoCs by achieving provides maximum throughput by introducing only small latency (typically just three clock cycles) while relying on an implementation that requires reduced area. Maximum throughput means that a full-duplex mesochronous link does not introduce any bandwidth limitation and the throughput is the same as in the case of an equivalent synchronous link even if the communication units require to manage a req-ack flow control. Three clock cycles of latency permit such a latency to be paid only for the first flit. For example, 1 flit requires 4 clock cycles, 2 flits require 5 clock cycles and 1000 flits require 1003 clock cycles. Additionally, a simple, reduced area implementation permits to dramatically reduce all the constraints on the clock skew, making them easier to meet with a lower time-to-market.

Also, a preferred embodiment of the arrangement described herein achieves a clock tree simplification, by avoiding that SoC complexity and wire-delay increase may render the clock tree a critical design issue, while also relaxing constraints on the clock skew.

In modern VLSI systems the overall power consumption is mainly due to the clock generators. By relaxing the constraints on the clock skew, power consumption could be significantly reduced.

The arrangement described herein is able to achieve potentially higher performance by removing constraints on clock skew, so that higher clock frequencies can be achieved.

The arrangement described herein is able to provide a full-duplex mesochronous link architecture which is particularly suitable to interconnect routers in Network on Chip architectures, particularly in those NoC solutions based on a req-ack protocol where router ports include a buffer that can be easily merged with the link buffer: such a merging enables a reduction in the depth of the link buffers to further simplify the overall complexity.

BRIEF DESCRIPTION OF THE DRAWINGS

The invention will now be described, by way of example only, with reference to the enclosed figures of drawing, wherein.

DETAILED DESCRIPTION OF PREFERRED EMBODIMENTS

Figure 1:
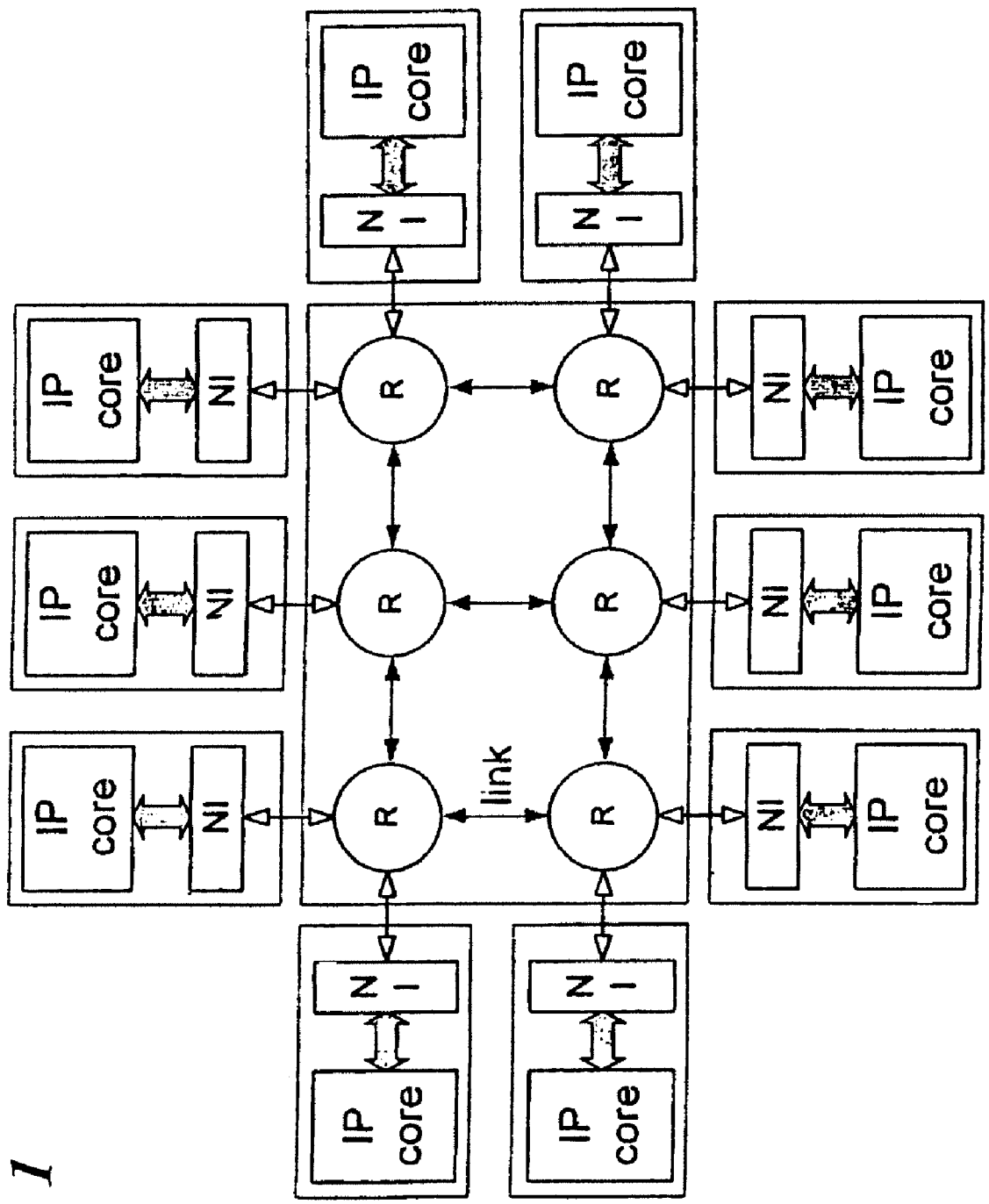
FIG. 1 is a functional block diagram of a NoC-based System-on-Chip architecture using mesochronous links.

FIG. 1 is a block schematic representation of System-on-Chip (SoC) architecture based on the Network-on-Chip (NoC) paradigm.

The main building blocks of a Network-on-Chip arrangement are the Network Interfaces, the Routers and the links. In the block diagram of FIG. 1 the Network Interfaces and the Routers are denoted NI and R, respectively. The Network Interfaces provide access points for the various IP (Intellectual Property) cores—of any known type—while the routers R provide the actual data transport mechanism, and the links are used to set up point-to-point interconnections.

As indicated, NoCs are usually designed according to a Globally Asynchronous Locally Synchronous (GALS) approach. This means that multiple clock domains coexist, typically including an IP clock domain(s) and a NoC clock domain while the routers R are expected to work at the same clock frequency.

Synchronous/asynchronous links connect the Network Interfaces NI with the routers R, while router-to-router links operate a mesochronous manner. By resorting to this approach, all the constraints on the clock skew can be removed and a drastic simplification of the clock tree can be achieved introducing a heavy speed-up and guaranteeing at same time maximum throughput and low latency.

Essentially, in the physical NoC arrangement of FIG. 1, all the routers R are interconnected by means of mesochronous links and the communication between a NI and a router R is performed using a mesochronous link in conjunction with a synchronizer. This approach enables the coexistence of many different independent clock regions (the ones of the IPs) and just a global clock domain that spans all the routers and reaches the NIs.

Thanks to the mesochronous links, the clock tree synthesis in the network clock domain is quite simple, since no need exists of meeting any constraints on clock skew: the clock can be distributed simply, with low effort. The NIs are responsible for end-to-end communication and implement the transport layer of the ISO/OSI stack. The routers R implement the network layer and the links implement the data-link layer. Each layer is implemented on top of the lower one according to a layered approach. Thus, both the NIs and the routers exploit the service provided by the links in order to put in place the point-to-point communication mechanism.

When using a conventional synchronous approach, in order to implement the data-link layer the capability to drive the data flow control is embedded at the NI and router interfaces: in this case, a link is just a set of wires and the physical layer involves just the mechanism concerning signal propagation. Introducing a mesochronous mechanism at the physical level, each link is more than a set of wires: in this case the link is responsible for properly managing the vertical interaction between data-link and physical layers.

The arrangement described herein extends the application of the SKew Insensitive Link (SKIL) mechanism (as disclosed in European Patent Application 06291440 for synchronizing modules in an integrated circuit) to transferring request signals and data from the initiator to the target and, vice versa, response signals and data from the target to the initiator.

An interesting feature of the arrangement described herein lies in the control unit at the receiver side (i.e. the target in case of requests and the initiator in case of responses), which deals with the flow control and manages the signals to drive the buffer structure.

Figure 2:
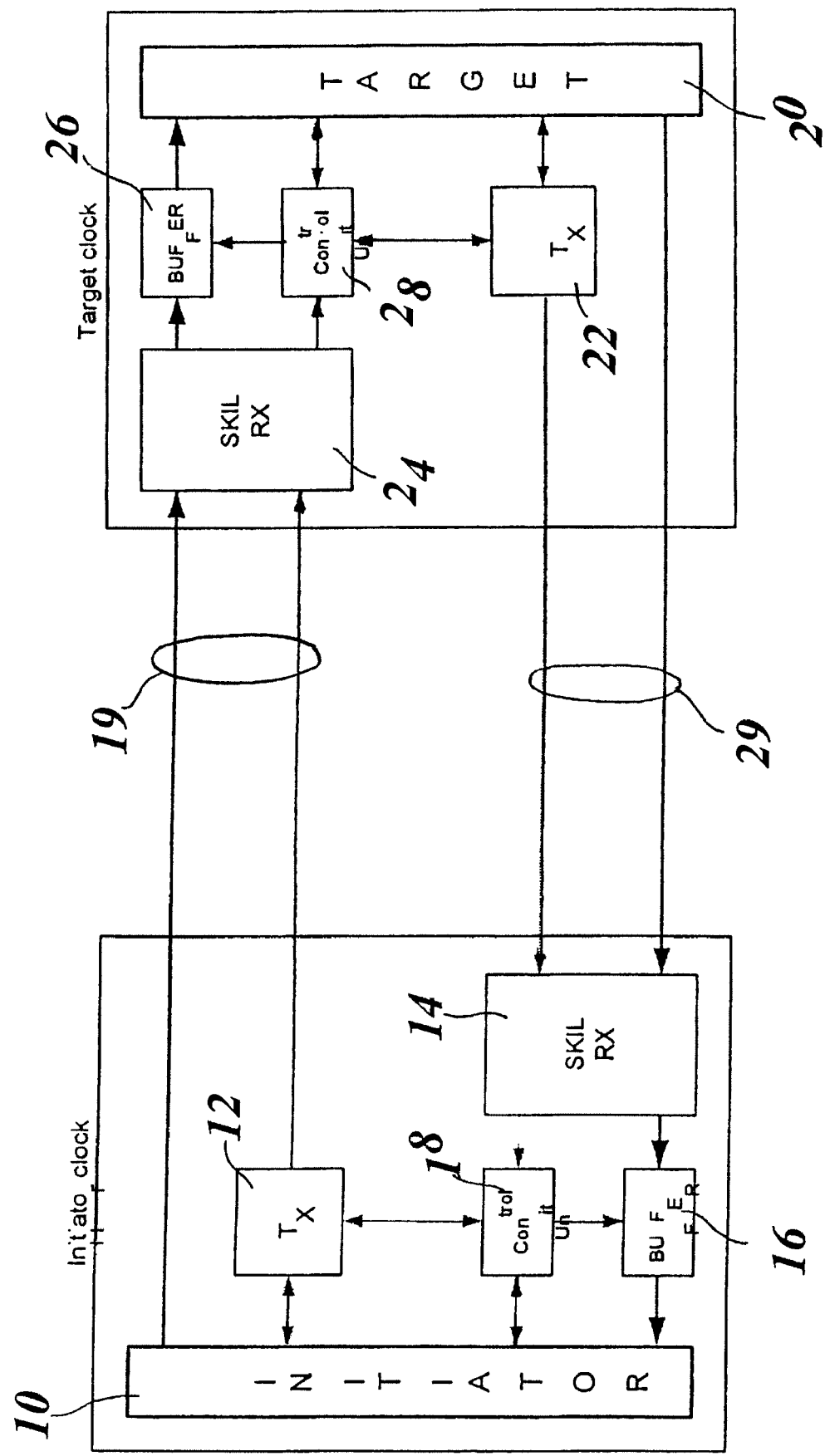
FIG. 2 is representative of the top-level view of a full-duplex mesochronous link.

FIG. 2 shows is a schematic "top-level" view of a full-duplex mesochronous link adapted to be used in connecting any of the routers R shown in FIG. 1.

Specifically, the full-duplex mesochronous link of FIG. 2 is intended to operate between an initiator 10 and a target 20, operating in respective clock domains, designated "initiator clock" and "target clock", respectively.

Each of the initiator 10 and the target 20 is coupled to a transmitter module (TX) 12, 22 and a receiver module (RX) 14, 24 so that requests can be transmitted by the initiator 10 and received by the target 20 and responses transmitted by the target 20 are received by the initiator 10.

Preferably, the transmitters 12, 22 and the receivers 14, 24 operate on the basis of the SKew Insensitive Link (SKIL) mechanism already mentioned in the foregoing.

Reference numerals 16, 26 indicate receiver buffers (e.g. 7-stage buffer structures) coupled to the transmitters 14, 24. Finally, reference numerals 18, 28 indicate two control units that co-ordinate operation of the various modules/elements associated with the initiator 10 and the target 20, respectively.

This arrangement leads to creating two "SKIL" links (i.e. a full-duplex SKIL link), typically in the form of buses, namely:
- a first link 19 for the transmitter 12 coupled to the initiator 10 to forward the requests towards the target 20 in a mesochronous manner, and
- a second link 29 for the transmitter 22 coupled to the target 20 to forward the responses towards the initiator 10, again in a mesochronous manner.

The full-duplex mesochronous link thus created provides an interface towards the data link layer (which can be at routers or NIs) and manage the SKIL physical layer through which information are actually propagated.

When combining two such links in a full-duplex mesochronous link, a problem arises in managing the flow control in that at the target side there is no immediate way to know if a request has been granted at the opposite end of the link. For the same reason, at the initiator interface there is no way to know if a response has been granted at the target side.

The arrangement described herein overcomes this difficulty by monitoring the request initiator flow control signals (init_req and init_ack) at the target interface and, vice versa, the response target flow control signals (targ_r_req and targ_r_gnt) at the initiator interface. This mechanism allows to know if a request (or a response) has been granted or not at the opposite link end.

This arrangement is advantageous in that it achieves maximum throughput and low-latency. It can be implemented through standard cells using a standard design flow; just two requirements are needed: clock signals are derived from the same source and interconnection delay is less than one clock period.

Unidirectional point-to-point links can thus be established with no clock skew constraints providing maximum throughput with latency up to two clock cycles. As better detailed in the following, operation is based on a particular mechanism which enables the communication between a transmitter (TX) and a receiver (RX) for any phase relationship between the two clock signals. Such a mechanism guarantees that no timing violations occur by assuring that RX reads data when they are stable.

Operation of the arrangement described herein relies on a two-stage buffer structure that is written by the transmitter and read by the receiver. The transmitter provides a strobe signal as needed at the receiver side for writing data in the buffer, while the receiver includes the needed buffering capability, manages the mechanism to recover the synchronization at system start-up (through the strobe signal) and correctly reads data from the buffer.

Operation of such an arrangement can be divided into two phases, start-up and steady-state.

During the first phase, correct synchronization is recovered by means of a synchronizer circuit and a proper initialization phase. No further synchronization is needed during steady-state operation, and there is the guarantee that no synchronization failures will occur. The start-up phase duration deterministically depends on the number of latches in the synchronizer. A policy for writing and reading data into and from the buffer in a "ping pong" fashion underlies steady-state operation.

In a typical operating scenario at the receiver side, the initial state is when both the buffer stages are empty and after synchronization has been performed. This policy guarantees that buffer reading always happens on stages where data are stable.

To implement operation as described, the transmitter (TX) blocks 12, 22 are configured in order to generate and propagate a signal req_ack along with the other data. This signal carries the information needed to know if the requests/responses have been granted or not at the opposite link end. In that way, each transmitter module 12 resp. 22, cooperating with the associated receiver module 24 resp. 14 implements the required mesochronous mechanism and also cooperates to implement a monitoring mechanism introduced in the previous section.

Figure 3:
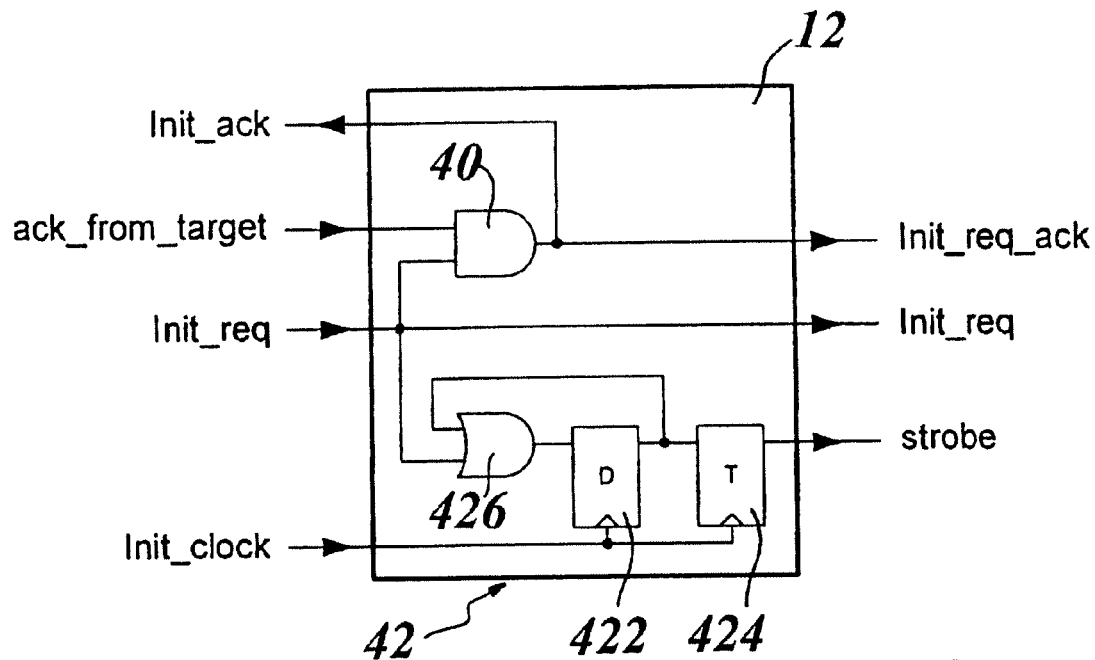
FIG. 3 is a block diagram schematics of a transmitter (TX) and interface related to an initiator in the arrangement described herein.

FIG. 3 shows the TX schematic and interface related to the initiator 10; it will be appreciated that, save for the possible different designation of the signals (e.g. "targ_" in the place of "init_"), the TX schematic and interface related to the target 20 is essentially identical, thus making it unnecessary to provide an analogous description for the target side.

As shown in the schematics of FIG. 3, the TX block 12 uses both the ack_from_target signal (coming from the response mesochronous path 29 and provided by the control unit 28 at the opposite link end to acknowledge receipt of a request) and the init_req signal (coming from the initiator 10 and indicating that a request has been sent to the target), to generate—usually as a simple logic product performing in an AND gate—two signals designated init_ack and init_req_ack.

The former of these (init_ack) is input to the initiator 10, while the latter (init_req_ack) is routed through the mesochronous request path 19 and reaches the control unit 28 at the opposite link end.

In addition to being fed to the AND gate 40, the init_req signal from the initiator 10 is also forwarded to target 20 and input to a strobe chain or register designated 42 as a whole.

The register 42 includes two cascaded edge-triggered flip-flops 422 (D) and 424 (T) clocked by the clock signal (here the initiator clock signal init_clock) plus an OR gate 426 whose inputs are fed with init_req signal from the initiator 10 and the output signal from the flip-flop 422.

The strobe signal thus generated at the output of the chain 42 permits to latch data issued from the initiator 10 (clocked by the initiator clock init_clock) and deliver them to the target 20 (in synchronism with the target clock targ_clock).

Specifically, the register 42 is controlled by the initiator clock signal init_clock for delivering data to be transferred in synchronism with the clock signal. The register 42 generates a strobe signal having a frequency equal to half the frequency of the initiator clock signal init_clock.

As shown, the OR logical gate 426 receives as a first input the signal init_req as a trigger signal and as a second input the output of the (edge triggered) flip-flop 422.

Similarly, the "dual" transmitter 22 at the target side (not shown in detail, as indicated) will include an identical chain to generate a strobe signal to latch data issued from the target 20 (clocked by the target clock targ_clock) and deliver them to the initiator 10 (in synchronism with the initiator clock init_clock).

At the receiver side (i.e. the target 20 for requests and the initiator 10 for responses), both data and signals pass through the receiver module 24 resp. 14 and issue therefrom synchronized with the receiver clock.

The arrangement shown permits to achieve synchronization at system start-up, according to the following procedure.

The transmitter (either at the initiator or at the target, depending in whether requests or response are considered) sets the trigger signal for a number of clock cycles required by the synchronization system. The transmission synchronizer module is triggered and the strobe signal generation is started.

The synchronization reception module at the receiver (again, either the target or the initiator, depending in whether requests or response are considered) samples the incoming trigger signals and properly triggers a strobe signal generator. Once synchronization has been completed, the phase relationship between the strobe signals at the transmitter and at the receiver is continuously kept and timing of buffer operation is made.

The synchronizing mechanism just described puts the strobe signals at the transmitter and the receiver in phase relationship such that safe operation is guaranteed for both buffers 16 and 26, by ensuring assuring that the rising and falling edges of the strobe control signal at the receiver always occurs enough time after the rising and falling edges of the strobe control signal at the transmitter to latch stable data.

The phase relationship between those two signals which are generated synchronously to the transmitter and receiver clock signals, respectively, depends on the amount of skew between the respective clock signals. The possibility will exist in any case to identify a time window in where a rising edge of the receiver strobe control signal will always guarantee correct buffer operation. Further details on this synchronization mechanism can be derived from European Patent Application 06291440—already cited.

Figure 4:
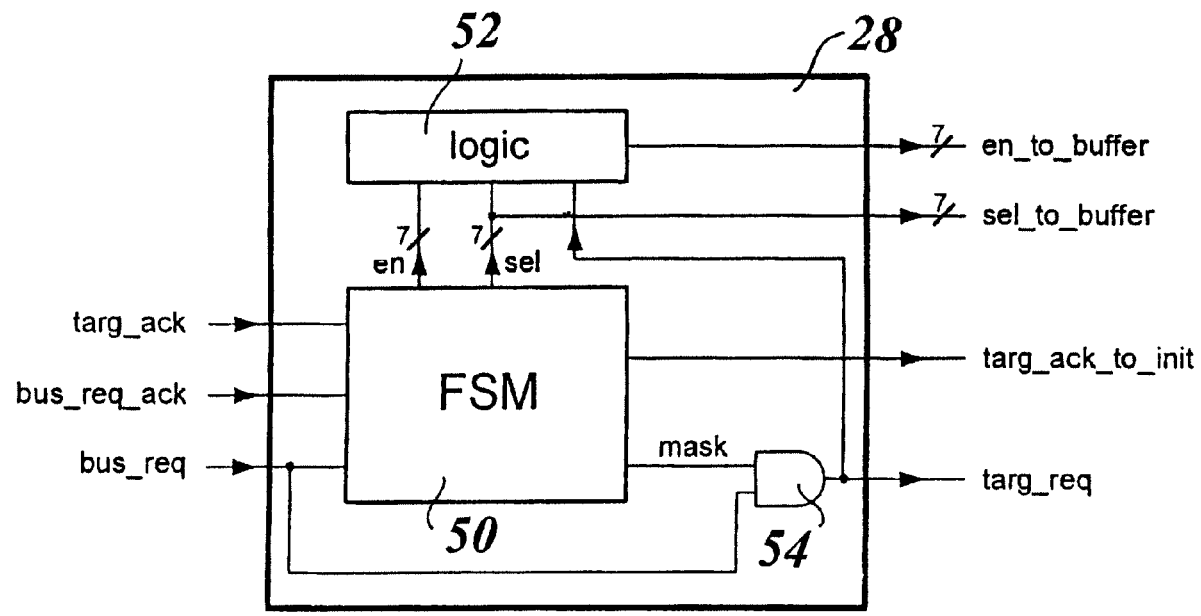
FIG. 4 is a block diagram representation of the architecture of a control unit in the arrangement described herein.

FIG. 4 summarizes the architecture of the control unit 28 on the target side. It will be appreciated that, save for the possible different designation of the signals, the control unit 18 is essentially identical, thus making it unnecessary to provide an analogous description for the initiator side.

Typically, the control unit 28 (resp. 18) includes a Finite State Machine (FSM) 50, a combinatorial circuit (logic network) 52 and an AND gate 54. This block is responsible for managing the buffer structure and the flow control with both the target request and the initiator response interfaces.

In FIG. 4 the signals with the prefix bus are the signals coming from the initiator side routed through the mesochronous request path 19. The signals en and sel generated by the FSM deal with the buffer driving, while the signals targ_req and targ_ack_to_init are the ones involved in the flow control.

The signals bus_rec_ack and bus_req are input to the FSM together with the acknowledgment message targ_ack from the target 20. The signal bus_req is also fed to one of the inputs of the AND gate 54.

The FSM generates two signals "en" and "sel" that are employed (in manner known per se, this point being of no specific momentum for the purposes of the present application) for driving the buffer 26 (resp. 16). This also applies to the structure and operation of the logic network 52 which are specific for the particular implementation adopted for the buffer: for instance, the buffer may be configured to support the possibility of moving a writing pointer and/or just one of the signals en and sel can be used.

As better detailed in the following in connection with FIG. 5, the FSM produces two signals, namely targ_ack_to_init and targ_req that are used for flow control purposes. In the embodiment shown, the signal targ_req is in fact produced as the logic product (performed in the AND gate 54) of the signal bus_req input to the FSM 50 and another signal, designated mask, produced by the FSM 50.

In the exemplary embodiment considered herein, the buffer 26 has a depth equal to 7 and, when empty, the buffer is bypassed thus providing direct connection to the target. Once again it is recalled that the details described in connection with modules associated with the target 20 will generally apply also to the modules associated with the initiator.

Operation of the full-duplex mesochronous link 19, 29 is based on the concept of transferring request data and signals from the initiator (or master) to the target (or slave) and, vice versa, response data and signals from the target to the initiator with proviso that either side/end of the link is put in a position to learn—via an acknowledgment signal—when a request/response is granted at the opposite end, thus dispensing with a heavy throughput limitation. Essentially, in the arrangement described herein, the initiator and target are caused to operate in the basis of a request-acknowledgment (or valid-acknowledgment) signalling protocol.

In order to keep the two clock domains fully decoupled, those request data and signals that from the initiator have to reach the target are routed through the mesochronous request channel 19. For the same reason, those response data and signals that from the target have to reach initiator are routed through the mesochronous response channel 29.

In principle, in such an arrangement e.g. a request coming from the initiator could be sampled by the target more than on time: according to a generic req-ack protocol, after that the ack signal is asserted, if the req signal would remain asserted for more than one cycle, and the target might sample more than one request, with the result that the same request is sampled different times. Exactly the same problem might arise at the initiator side for the responses.

The arrangement described herein avoids this possible by making sure that, in order that a new request may reach the target, two events are needed to occur:

the propagation of the ack through the mesochronous response channel 29, and the propagation of a new request (or the new r_req value) through the mesochronous request channel 19.

In a thoroughly symmetrical way, in order that a new response may reach the initiator, two events are needed to occur:

the propagation of the ack through the mesochronous request channel 19, and the propagation of a new response (or the new resp value) through the mesochronous response channel 29.

Thanks to the mechanism for monitoring flow-control signals just described (which is implemented primarily via the init_req_ack signal), the possibility arises of ascertaining if a request reaching the target had been previously granted (init_ack=1) or not (init_ack=0) at the initiator interface.

In a typical embodiment, the two events mentioned in the foregoing represent necessary conditions to be met. In other embodiments, at the time instant where the signal bus_req at the input of the FSM 50 is equal to one, the request is construed as a "real" one if also the condition bus_req_ack=1 is met.

This mechanism is made possible because the initiator flow-control information is monitored at the target and, vice versa, the target flow-control information is monitored at the initiator.

In principle, this arrangement might turn out to be quite ineffective as it might heavily reduce the throughput (in order to transfer a flit, the round-trip latency has to be paid).

In the arrangement described herein this possible drawback is avoided in view of the buffering capability at both the target and initiator sides of the full-duplex link 19, 29 by properly managing flow-control signals. The preferred flow-control managing policy also affects latency, thus optimizing performance in terms of both throughput and latency.

Specifically, the control units 28, 18 optimize latency by providing the acknowledgment even if the target is busy or there is no request coming from the initiator (e.g. at the initiator side the ack signal is masked with the req one by the TX unit)

As better detailed in the following in analysing operation of the respective FSM, the control units 28, 18 de-assert their ack signals only in the situation in which the buffer could become full.

Figure 5:
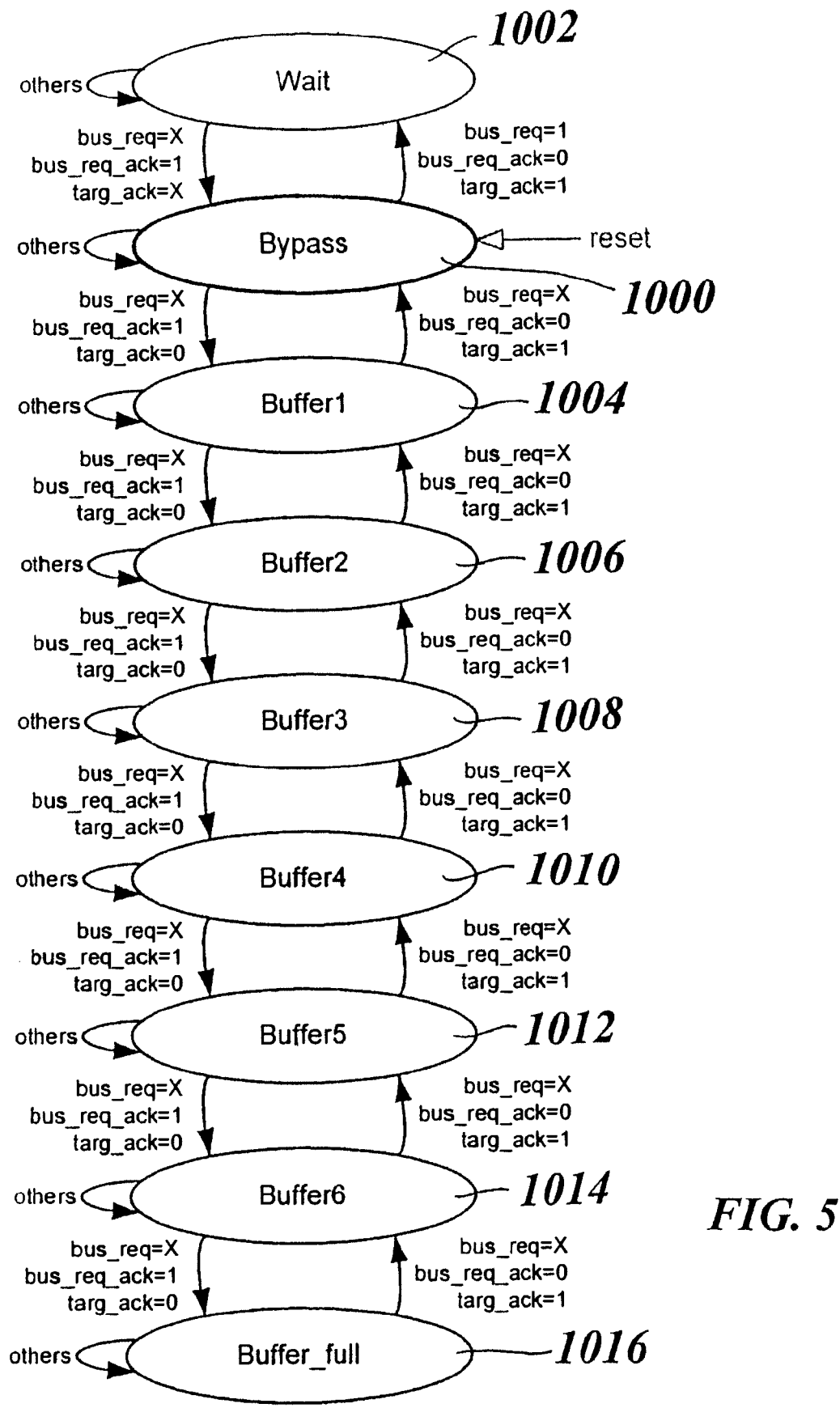
FIG. 5 is an exemplary transition state diagram of a Finite State Machine (FSM) associated therewith.

An exemplary transition state diagram for the FSM 50 in the control unit 28 is shown in FIG. 5.

The meaning of each state and the actions performed are discussed in the following.

The Bypass state (1000 in FIG. 5) is the reset state. Here the first buffer location is enabled and the buffer is bypassed. Therefore, data coming from the receiver RX are forwarded to the target 20 and, at the same time, written into the first buffer location.

The signal designated "mask" is set to 1 in order to enable the bus_req signal to reach the target. The targ_ack_to_init signal is also set to 1: this is because in this state the buffer is empty and the requests can be granted at the initiator side even if the target cannot accept them.

When a request not granted comes (bus_req=1 and bus_req_ack=0):
if the target 20 gives the acknowledgment (targ_ack=1) the next state will be Wait (1002 in FIG. 5);
if the target 20 does not give the acknowledgment the next state will be still Bypass (i.e. 1000).

When a granted request comes:
if the target 20 does not give the acknowledgment, the next state will be Buffer1 (1004 in FIG. 5): here the buffer signals are driven to increment the buffer pointer and properly manage the flow control;
if the target gives the acknowledgment the next state remains Bypass (i.e. 1000).

For all the other cases the next state will remain Bypass (i.e. 1000).

In the Wait state 1002 the situation is the same of the Bypass state except for the signal mask that is forced to 0 in order to avoid the target grants the same request at different times.

In brief, in the Wait state 1002:
the target 20 is available to accept a request;
the request on the bus (at the RX output) has not been granted at the initiator side;
the request in input to the target is forced to 0 by means of the mask signal;
the targ_ack_to_init signal is set to 1 because the buffer is empty and the requests can be granted at the initiator.

When the bus_req_ack signal goes to 1, the FSM 50 will come back in the Bypass state (i.e. 1000), otherwise the next state will be still Wait (i.e. 1002).

The designation BufferX (X=1, 2, 3, 4, 5, 6) denotes a set of states designated 1004 to 1014 in FIG. 5.

When the FSM 50 goes to any of the states Buffer1, Buffer2, Buffer3, Buffer4, Buffer5 or Buffer6, the buffer pointer is incremented, the mask signal is set to 1 and the targ_ack_to_init signal is forced to 0.

This behavior guarantees that subsequent requests are stored (into the buffer) even if the target does not grant them. In the worst case, from the time in which the target close the communication (targ_ack=0), seven requests will be received at the target side and the buffer will be saturated with no losses.

In any of the BufferX states, when a granted request comes:
if the target 20 does not give the acknowledgment, the next state will be BufferX+1;
if the target 20 gives the acknowledgment the next state remains BufferX.

When there is no request on the bus (bus_req_ack=0: if there is a request, it surely has been granted at the initiator side):
if the target does not give the acknowledgment, the next state will remain BufferX;
if the target gives the acknowledgment the next state remains BufferX−1.

When the FSM 50 is in the Buffer_full state (1016 in FIG. 5) the buffer is full and there is the guarantee that no additional requests will come from the bus.

Here the behavior is the same as previously described in connection with the BufferX states except for the fact that only the transitions with the Buffer6 state are possible.

Without prejudice to the underlying principles of the invention, the details and the embodiments may vary, even appreciably, with reference to what has been described by way of example only, without departing from the scope of the invention as defined by the annexed claims.

The invention claimed is:

1. A method of providing data transport over a full-duplex mesochronous link, wherein request signals and response signals are exchanged between an initiator and a target operating in respective clock domains at opposite ends of said full-duplex mesochronous link, the method comprising:
monitoring request initiator flow control signals at the target end of said link;
monitoring response target flow control signals at the initiator end of said link;
ascertaining at said target end of said link, as a result of monitoring said request initiator flow control signals, if a request has been granted at the initiator end of said link;
ascertaining at said initiator end of said link, as a result of monitoring said response target flow control signals, if a response has been granted at the target end of said link;
providing an initiator clock to the initiator and providing a target clock to the target, the initiator clock and the target clock having the same frequency but having unknown relative phases and having an interconnection delay therebetween of less than one clock period; and managing data flow between said initiator and said target by ensuring that
a new request from the initiator reaches the target only if acknowledgement of a previous request has propagated from the target to the initiator, and
a new response from the target reaches the initiator only if acknowledgement of a previous response has propagated from the initiator to the target,
wherein said target provides said acknowledgment even if busy and said initiator provides said acknowledgment even if no request is coming from the initiator.

2. The method of claim 1, further comprising:
generating at said initiator and said target and propagating therefrom respective signals carrying the information indicative of whether a request has been granted at the initiator end of said link and whether a response has been granted at the target end of said link.

3. The method of claim 1, further comprising:
generating at said initiator and said target and propagating therefrom respective signals carrying the information indicative of whether a request has been granted at the initiator end of said link and whether a response has been granted at the target end of said link.

4. The method of claim 3, wherein said full-duplex mesochronous link is included in a Network-on-Chip (NoC) arrangement and at least one of said initiator and said target is a router in said NoC arrangement.

5. The method of claim 1, further comprising:
latching data issued from said initiator clocked by a respective initiator clock and delivering said data to said target in synchronism with a respective target clock; and
latching data issued from said target clocked by said respective target clock and delivering said data to said initiator in synchronism with said respective initiator clock.

6. The method of claim 1, wherein said full-duplex mesochronous link is included in a Network-on-Chip (NoC) arrangement and at least one of said initiator and said target is a router in said NoC arrangement.

7. A computer program product, loadable in the memory of at least one computer and including software code portions for performing the method of claim 1.

8. A communication network including at least one full-duplex mesochronous link for providing data transport, wherein request signals and response signals are exchanged between an initiator and a target operating in respective clock domains at opposite ends of said at least one full-duplex mesochronous link, the network comprising:
target circuitry at the target end of said link, configured to monitor the request initiator flow control signals and ascertain, as a result of monitoring said request initiator flow control signals, if a request has been granted at the initiator end of said link, the target circuitry receiving a target clock signal having a frequency and a source;
initiator circuitry, at the initiator end of said link, configured to monitor the response target flow control signals and ascertain, as a result of monitoring said response target flow control signals, if a response has been granted at the target end of said link, the initiator circuitry receiving an initiator clock having the same frequency and being derived from the same source as the target clock, but having an unknown relative phase and having an interconnection delay relative to the target clock of less than one clock period,
wherein said target circuitry and said initiator circuitry are configured for managing data flow between said initiator and said target by ensuring that a new request from the initiator reaches the target only if acknowledgement of a previous request has propagated from the target to the initiator, and a new response from the target reaches the initiator only if acknowledgement of a previous response has propagated from the initiator to the target, and wherein said target circuitry is further configured to provide said acknowledgment even if the target is busy and said initiator circuitry is further configured for providing said acknowledgment even if no request is coming from the initiator.

9. The computer network of claim 8, wherein said full-duplex mesochronous link includes a mesochronous request channel from said initiator to said target and mesochronous response channel from said target to said initiator.

10. The computer network of claim 9, wherein said target circuitry and said initiator circuitry are configured for managing data flow between said initiator and said target by ensuring that:
a new request from the initiator reaches the target only if acknowledgement of a previous request has propagated from the target to the initiator, and
a new response from the target reaches the initiator only if acknowledgement of a previous response has propagated from the initiator to the target.

11. The computer network of claim 10, wherein said initiator circuitry and said target circuitry include respective buffers for data transported over said at least one full-duplex mesochronous link and wherein said initiator circuitry and said target circuitry are configured to de-assert their acknowledgment signal when the respective buffer is expected to become full.

12. The computer network of claim 9, wherein at least one of said initiator and said target is a router in a Network-on-Chip arrangement.

13. The computer network of claim 8, wherein said initiator circuitry and said target circuitry include respective buffers for data transported over said at least one full-duplex mesochronous link and wherein said initiator circuitry and said target circuitry are configured to de-assert their acknowledgment signal when the respective buffer is expected to become full.

14. The computer network of claim 8, further comprising:
respective transmitter modules at said initiator and said target to generate and propagate therefrom respective signals carrying the information indicative of whether a request has been granted at the initiator end of said link and whether a response has been granted at the target end of said link.

15. The computer network of claim 8, further comprising:
a strobe chain at said initiator for generating a strobe signal for latching data issued from said initiator clocked by a respective initiator clock and delivering said data to said target in synchronism with a respective target clock; and
a strobe chain at said target for generating a strobe signal for latching data issued from said target clocked by said respective target clock and deliver said data to said initiator in synchronism with said respective initiator clock.

16. The computer network of claim 8, wherein at least one of said initiator and said target is a router in a Network-on-Chip arrangement.

* * * * *